United States Patent Office 3,563,082
Patented Feb. 16, 1971

3,563,082
METHOD FOR REMOVING BURRS FROM SINTERED WORK PIECES
Gerhard Zapf, Krebsoge, Germany, assignor to Sintermetallwerk Krebsoge G.m.b.H., Krebsoge, Rhineland, Germany
Original application June 3, 1966, Ser. No. 555,138, now Patent No. 3,455,138. Divided and this application Feb. 24, 1969, Ser. No. 816,860
Int. Cl. B21j *11/00*
U.S. Cl. 72—374                              3 Claims

ABSTRACT OF THE DISCLOSURE

The disclosure relates to a method of forming sintered workpieces. The disclosed process sinters and presses metal powder to form a workpiece to shape. The burrs formed in the workpiece as a result of the pressing operation are subsequently pressed into the workpiece by a separate pressing operation.

---

This application is a division of Ser. No. 555,138, filed on June 3, 1966, now U.S. Pat. No. 3,455,138.

Sintered workpieces made of metal powder are usually manufactured by a multi-stage process. In the first stage a blank is pressed out of metal powder, and then in the second stage this blank is solidified by sintering, and finally in a third production step the blank is dimensioned accurately by a dimension pressing operation. In the manufacture of very dense sintered products, after the workpiece has been sintered it is pressed again and then, after a second heat treatment, is finished to accurate dimensions in a dimension press.

In order to produce a workpiece as homogeneous as possible the press tool usually consists of several shaping parts. For example to produce a cylindrical product the press tool consists of a central die, an upper die and a lower die, and there is also an internal pin or plunger in the tool. The several parts of a tool of this kind move within each other with a certain amount of clearance between the moving parts, and consequently during the initial pressing operation a certain amount of the metal powder becomes pushed out into the gap between the moving parts of the tool. In this way there are formed at all those edges of the workpiece which are formed by two or more contiguous parts of the tool burrs or flashes which follow the directions of the gaps.

Before the workpiece can be used, particularly if accuracy is required, it is necessary to remove these burrs. This is usually done by tumbling or slide grinding, but in many cases this produces unsatisfactory results. For example sintered parts made of easily deformed materials of construction and which have bores often acquire impermissible dimensional constrictions at the inlet to the bore during the deburring process. Furthermore the tumbling is often done with aqueous abrasive emulsions and the liquid penetrates the pores of the workpiece, from which it can be removed only with difficulty. Residual liquid in the pores of the sintered workpieces produces subsequent corrosion.

The object of this invention is to provide a method of deburring sintered workpiece which eliminates the disadvantages of the customary deburring processes and to provide a device for carrying out this method.

To this end, according to this invention, burrs produced on sintered workpieces by pressing during sintering are pressed into the workpiece by tools which act only on the burrs.

Although the deburring by means of deburring presses tools can in principle be performed after any of the process stages between the pressing of the metal powder and the final pressing to accurate dimensions nevertheless it has been found advantageous to round off the burred edges by means of deburring press tools after the sintering, that is to say just before the final dimension pressing. Preferably during a working stroke of a press a first workpiece is deburred and a second workpiece which has previously been deburred is simultaneously pressed to finished dimensions the workpieces being conveyed during successive working strokes of and then to dimensioning press tools and finally to an ejection station.

The invention also includes a press for carrying out the method in accordance with the invention this press being characterised in that it has press tools which are arranged to touch the workpiece only at its burred edges. Preferably the press includes a stationary press table and a movable platten, the table and platten carrying both the deburring tools and tools for the further pressing operation of the workpiece to finished dimensions and the press table being constructed in the form of a guiding track extending between a feed magazine, the deburring tools, the tools for the further pressing operation and an ejection station, and being equipped with a gripper or a pushing device for advancing the workpieces.

The invention will now be described by way of example with reference to the accompanying drawings in which.

Figure 1:
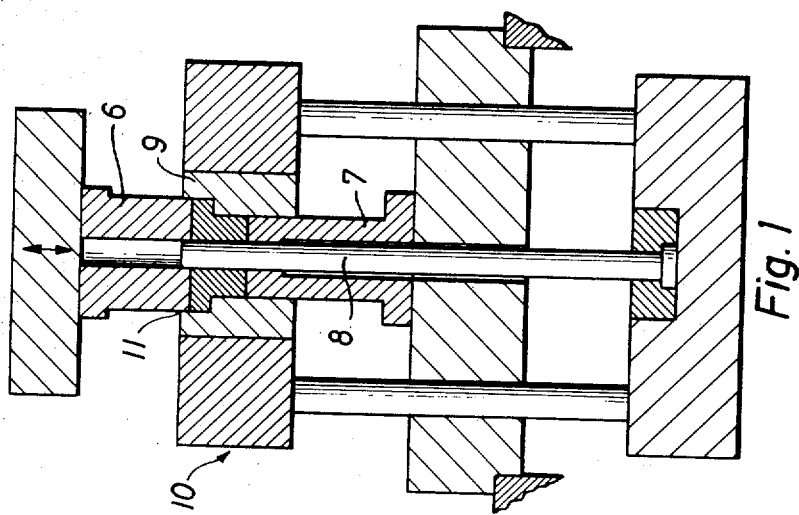
FIG. 1 is a diagrammatic vertical section of a press tool of the usual kind, during the pressing position.

The press tool shown in FIG. 1 consists essentially of an upper die 6, a lower die 7 in which a plunger 8 is guided, and a central die 9 into which metal powder is filled when a press 10 which supports them is in a filling position (not shown). The parts 6 to 9 of the press tool are installed in the press 10, which actuates the individual parts of the tool. During the pressing operation (as shown in FIG. 1) the upper die 6 moves downwards and compacts the metal powder. In the example shown in the drawings, the pressed part 11 is a flanged bush.

Figure 2:
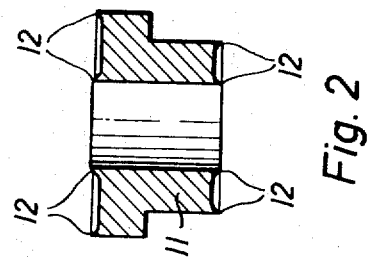
FIG. 2 is a vertical section of a sintered part as it comes from the press tool shown in FIG. 1.

The parts 6, 7, 8 and 9 of the two press tool slide in and out of each other with a certain amount of play, with the result that during the pressing operation some of the metal powder contained in the central die 9 is squeezed out into the gaps between the surfaces of the different parts of the tool, leaving burrs 12 on the pressed part 11 as shown in FIG. 2.

Figure 4:
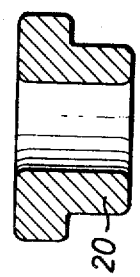
FIG. 4 is a section similar to FIG. 2, but showing a part after deburring by the tool shown in FIG. 3 and, FIG. 5 is a diagrammatic vertical section of a device for performing a series of pressing operations in sequence.
Figure 3:
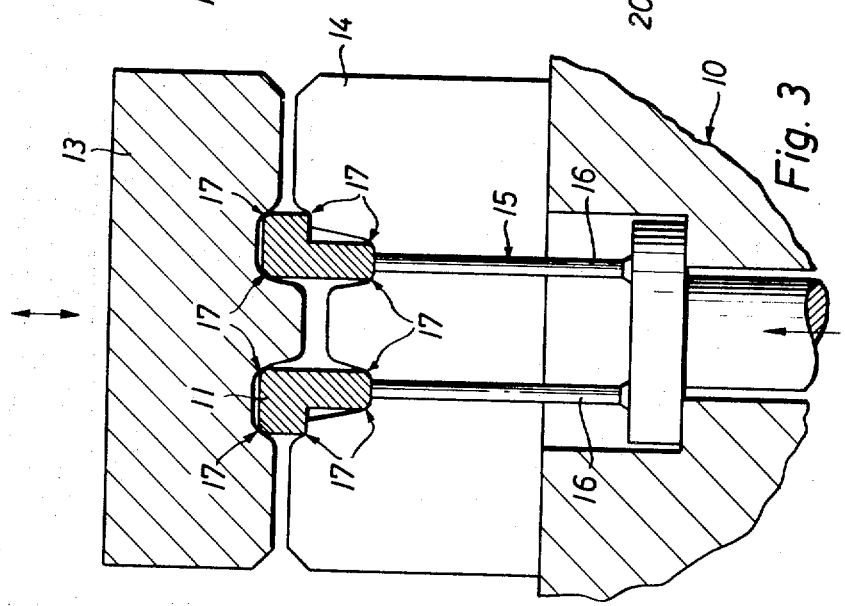
FIG. 3 is a diagrammatic vertical section of a deburring press tool.

A deburring press tool as shown in FIG. 3 consists of an upper deburring die 13 and a lower deburring die 14, which is attached to the press 10. The lower deburring die 14 has bores 15 in which ejector plungers 16 are guided. The pressed part 11, with its edge burrs 12, is inserted into the lower deburring die 14, and the upper deburring die 13 is moved downwards. In this operation it is only the rounded surfaces 17 which come into contact with the blank by deformation, producing rounded edges without any serious changes in the dimensions and shape of the workpiece. The deburred part 20 (FIG. 4) is then ejected from the lower deburring die 14 by the two ejector plungers 16, whereupon the part is conveyed to the dimensioning press, which gives it its final dimensions.

Figure 5:
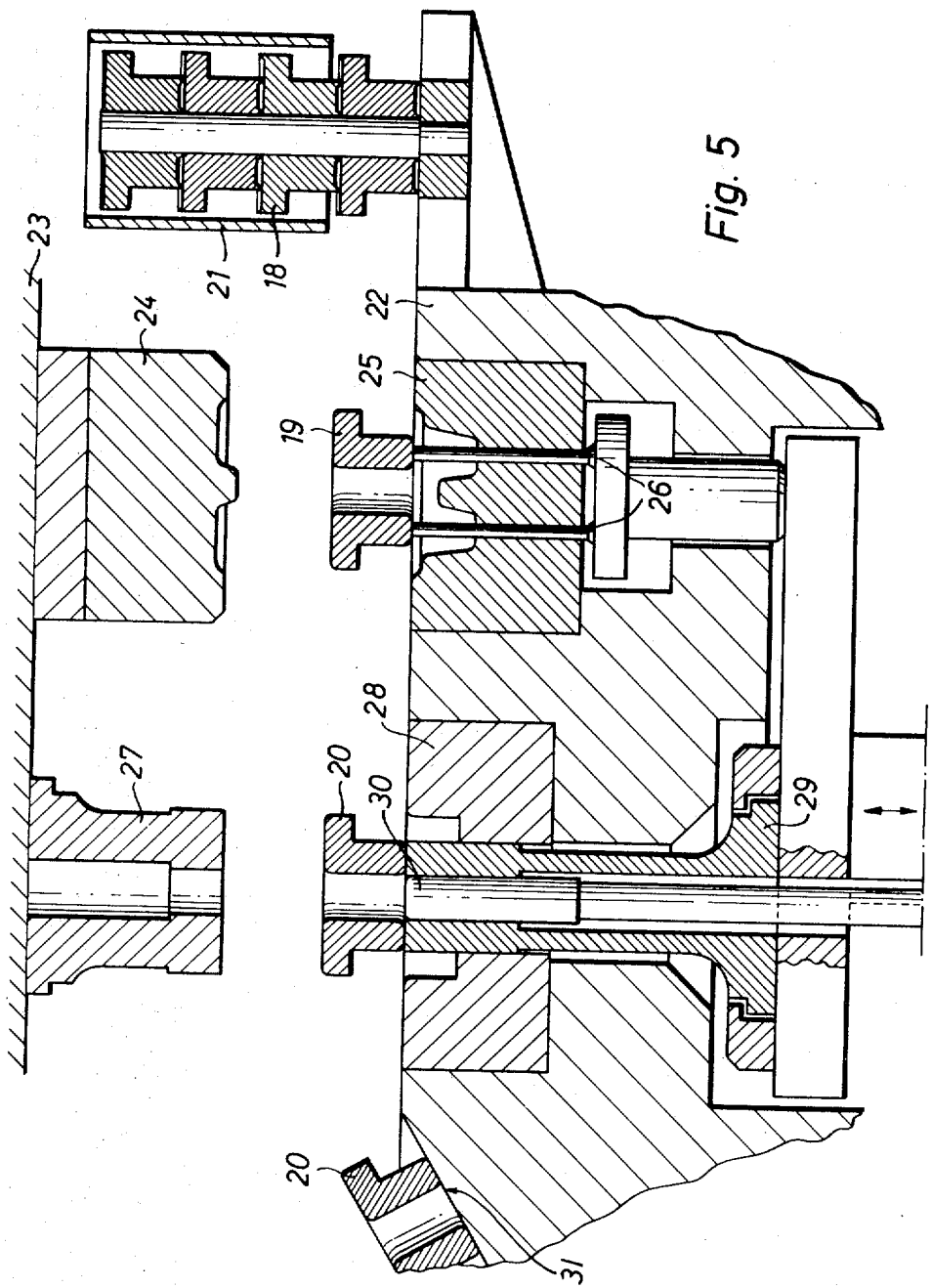

In a specially advantageous version of the device according to the invention shown in FIG. 5, sintered and pressed blanks 18, which have burred edges, are fed from a magazine 21 by means of a gripper (not shown) and conveyed across the press table 22, which is constructed as a guiding track for the movement, to the deburring tool and subsequently from there to the dimensioning tool, and from there ultimately to a finished product chute 31. The deburring tool consists essentially of an upper deburring die 24 mounted on a press platten 23, and a sationary lower deburring die 25 mounted in the press table 22 and equipped with ejector plungers 26. Mounted on the press platten 23 there is also a dimensioning upper die 27 which, together with a lower dimensioning die 28, which is mounted in the press table 22, deforms the workpiece to its final accurate dimensions. In the dimensioning die 28 an ejector plunger 29 slides and this also acts as a guide for a dimensioning plunger 30.

During the downward movement of the press platten 23 two operations take place at the same time. On the one hand a sintered blank 18 is deburred and, at the same time, a deburred blank 19 is finished to dimensions in the dimensioning dies. With the working rhythm of the machine a gripper conveys a blank 18, which has burrs, from the feeding magazine to the deburring tool, and at the same time conveys a deburred workpiece 19 from the deburring tool to the dimensioning tool, and also conveys a finished product 20, accurate in dimensions, from the dimensioning tool to the chute 31.

I claim:
1. In a process for the production of sintered workpieces including the steps of sintering and pressing metal powder to form said workpiece to shape, the improvement which comprises pressing burrs produced on said workpiece during said pressing step into said workpiece by a separate pressing operation with pressing tools acting only on said burrs.

2. A process as claimed in claim 1, including a further step of finally pressing said workpiece so as to form it to finished dimensions, after pressing said burrs into said workpiece directly prior to said final pressing step.

3. A process as claimed in claim 2, including the step of operating a press through a series of working strokes, conveying a first workpiece formed with burrs from a feed magazine to deburring press tools carried by said press, pressing said burrs on said first workpiece into said first workpiece during a first working stroke, conveying said first workpiece from said deburring tools to dimensioning tools in said press and simultaneously conveying a second workpiece from said feed magazine to said deburring tools and, during a subsequent working stroke, carrying out said final pressing step on said first workpiece and simultaneously pressing the burrs on said second workpiece into said second workpiece.

References Cited
UNITED STATES PATENTS

| | | | |
|---|---|---|---|
| 2,540,457 | 2/1951 | Rice | 29—420.5 |
| 2,549,939 | 4/1951 | Shaw et al. | 29—420.5 |

RICHARD J. HERBST, Primary Examiner

U.S. Cl. X.R.

29—420.5; 72—405